(12) United States Patent
Gremse et al.

(10) Patent No.: US 9,589,204 B2
(45) Date of Patent: Mar. 7, 2017

(54) QUANTIFICATION OF A CHARACTERISTIC OF A LUMEN OF A TUBULAR STRUCTURE

(75) Inventors: Felix Gremse, Limbourg (BE); Fabian Maximilian Alexander Kiessling, Aachen (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 252 days.

(21) Appl. No.: 13/823,151

(22) PCT Filed: Sep. 15, 2011

(86) PCT No.: PCT/IB2011/054034
§ 371 (c)(1),
(2), (4) Date: Mar. 14, 2013

(87) PCT Pub. No.: WO2012/038863
PCT Pub. Date: Mar. 29, 2012

(65) Prior Publication Data
US 2013/0223706 A1   Aug. 29, 2013

Related U.S. Application Data

(60) Provisional application No. 61/384,346, filed on Sep. 20, 2010.

(51) Int. Cl.
*G06K 9/00* (2006.01)
*G06T 7/00* (2006.01)
(Continued)

(52) U.S. Cl.
CPC ......... *G06K 9/4671* (2013.01); *G06K 9/3233* (2013.01); *G06T 7/0012* (2013.01);
(Continued)

(58) Field of Classification Search
CPC . G06T 2207/30101; G06T 2207/30104; G06T 2211/40; G06T 7/0079
See application file for complete search history.

(56) References Cited

U.S. PATENT DOCUMENTS 5,768,405 A * 6/1998 Makram-Ebeid ............. 382/128
6,377,832 B1   4/2002 Bergman et al.
(Continued)

FOREIGN PATENT DOCUMENTS

CN   1981706   6/2007
CN   101493940 A   7/2009
(Continued)

OTHER PUBLICATIONS

Li, H., et al.; Vessels as 4-D Curves: Global Minimal 4-D Paths to Extract 3-D Tubular Surfaces and Centerlines; 2007; IEEE Trans. on Medical Imaging; 26(9)1213-1223.
(Continued)

*Primary Examiner* — Utpal Shah

(57) ABSTRACT

A method includes generating, based on a distance map, a signal indicative of a quantification of a characteristic of a lumen of a tubular structure of interest over a pre-determined extent of the tubular structure of interest represented in volumetric imaging data. A system includes a quantifying component (216) that generates, based on a distance map, a signal indicative of a quantification of characteristic of a lumen of a tubular structure of interest over a pre-determined extent of the tubular structure of interest represented in volumetric imaging data. A method includes identifying voxels of 3D segmented imaging data that represent tubular structure of interest, determining distances between the identified voxels and nearest voxels corresponding to other structure in a plurality of 2D slices of the segment imaging data, representing the voxels with intensity values that are
(Continued)

proportional to the distances, and generating a signal indicative of a 3D distance map based on the intensity values.

23 Claims, 5 Drawing Sheets

(51) Int. Cl.
*G06K 9/46* (2006.01)
*G06K 9/32* (2006.01)
*G06T 7/60* (2006.01)
*G06T 11/00* (2006.01)

(52) U.S. Cl.
CPC .............. *G06T 7/0079* (2013.01); *G06T 7/60* (2013.01); *G06T 11/003* (2013.01); *G06T 2207/10081* (2013.01); *G06T 2207/10088* (2013.01); *G06T 2207/10132* (2013.01); *G06T 2207/20108* (2013.01); *G06T 2207/30101* (2013.01); *G06T 2211/40* (2013.01)

(56) References Cited

U.S. PATENT DOCUMENTS

| | | | |
|---|---|---|---|
| 8,157,742 B2 | 4/2012 | Taylor | |
| 8,200,466 B2 | 6/2012 | Spilker | |
| 8,249,815 B2 | 8/2012 | Taylor | |
| 2001/0031920 A1* | 10/2001 | Kaufman et al. | 600/431 |
| 2003/0099386 A1* | 5/2003 | Schneider et al. | 382/130 |
| 2003/0108145 A1* | 6/2003 | Knoplioch et al. | 378/4 |
| 2004/0109603 A1* | 6/2004 | Bitter et al. | 382/154 |
| 2005/0033114 A1* | 2/2005 | Geiger et al. | 600/101 |
| 2005/0105786 A1* | 5/2005 | Moreau-Gobard et al. | 382/128 |
| 2005/0240094 A1 | 10/2005 | Pichon et al. | |
| 2006/0056694 A1 | 3/2006 | Rinck et al. | |
| 2006/0062447 A1* | 3/2006 | Rinck et al. | 382/154 |
| 2006/0159326 A1* | 7/2006 | Rasche et al. | 382/131 |
| 2007/0049840 A1 | 3/2007 | Odry et al. | |
| 2007/0249912 A1* | 10/2007 | Tek | 600/300 |
| 2007/0276223 A1 | 11/2007 | De Bliek | |
| 2007/0297561 A1* | 12/2007 | Breeuwer et al. | 378/4 |
| 2008/0071160 A1* | 3/2008 | Wiemker et al. | 600/407 |
| 2008/0132774 A1* | 6/2008 | Milstein et al. | 600/407 |
| 2008/0219530 A1* | 9/2008 | Levanon et al. | 382/130 |
| 2008/0317314 A1* | 12/2008 | Schwartz et al. | 382/131 |
| 2009/0003668 A1* | 1/2009 | Matsumoto | 382/128 |
| 2009/0226063 A1* | 9/2009 | Rangwala et al. | 382/128 |
| 2009/0268954 A1* | 10/2009 | Niinuma et al. | 382/128 |
| 2009/0279758 A1* | 11/2009 | Dikici et al. | 382/128 |
| 2010/0014628 A1* | 1/2010 | Kadomura et al. | 378/4 |
| 2010/0067753 A1 | 3/2010 | Visser | |
| 2010/0074493 A1* | 3/2010 | Wiemker et al. | 382/130 |
| 2010/0130878 A1 | 5/2010 | Lasso | |
| 2010/0241404 A1 | 9/2010 | Taylor | |
| 2010/0290693 A1* | 11/2010 | Cohen et al. | 382/134 |
| 2011/0206248 A1 | 8/2011 | Ruijters | |
| 2011/0206250 A1* | 8/2011 | McGinnis et al. | 382/128 |
| 2011/0307231 A1 | 12/2011 | Kirchner | |
| 2012/0022843 A1 | 1/2012 | Ionasec | |
| 2012/0041318 A1 | 2/2012 | Taylor | |
| 2012/0041319 A1 | 2/2012 | Taylor | |
| 2012/0041320 A1 | 2/2012 | Taylor | |
| 2012/0041321 A1 | 2/2012 | Taylor | |
| 2012/0041322 A1 | 2/2012 | Taylor | |
| 2012/0041323 A1 | 2/2012 | Taylor | |
| 2012/0041735 A1 | 2/2012 | Taylor | |
| 2012/0041739 A1 | 2/2012 | Taylor | |
| 2012/0053919 A1 | 3/2012 | Taylor | |
| 2012/0059246 A1 | 3/2012 | Taylor | |
| 2012/0072190 A1 | 3/2012 | Sharma | |
| 2012/0121151 A1 | 5/2012 | Bernhardt | |
| 2012/0243761 A1 | 9/2012 | Senzig | |

FOREIGN PATENT DOCUMENTS

| | | | | |
|---|---|---|---|---|
| DE | 102008014792 | | 6/2009 | |
| WO | 2004025572 | | 3/2004 | |
| WO | 2006061814 | | 6/2006 | |
| WO | 2006061815 | | 6/2006 | |
| WO | WO 2009022283 A1 * | | 2/2009 | G06T 7/00 |
| WO | 2010022762 | | 3/2010 | |

OTHER PUBLICATIONS

Wolf, I., et al.; ROPES: A Semiautonnated Segmentation Method for Accelerated Analysis of Three-Dimensional Echocardiographic Data; 2002; IEEE Trans. on Medical Imaging; 21(9)1091-1104.

Xu, Y., et al.; Quantification of Stenosis in Coronary Artery via CTA Using Fuzzy Distance Transform; 2009; Proc. of SPIE Intl. Soc. for Optical Engineering; vol. 7262; 12 pages.

* cited by examiner

QUANTIFICATION OF A CHARACTERISTIC OF A LUMEN OF A TUBULAR STRUCTURE

CROSS REFERENCE TO RELATED APPLICATIONS

This application is a national filing of PCT application Serial No. PCT/IB2011/054034, filed Sep. 15, 2011, published as WO 2012/038863 A1 on Mar. 29, 2012, which claims the benefit of U.S. provisional application Ser. No. 61/384,346 filed Sep. 20, 2010, which is incorporated herein by reference.

The following generally relates to quantifying a characteristic of a lumen of a tubular structure and is described herein with particular application to computed tomography (CT) and quantifying stenoses in connection with a blood vessel of a human or animal subject. However, the following is also amenable to other applications and/or other imaging modalities such as magnetic resonance imaging (MRI), ultrasound (US) imaging and/or other imaging modalities.

The accurate measurement of the degree of stenosis of a blood vessel is important for determining proper clinical intervention for patients that suffer from atherosclerotic stenosis. Medical imaging has been used to acquire data from which measurement of the degree of stenosis can be obtained. An example of a suitable medical imaging procedure is a three dimensional (3D) angiogram, which has different pixel intensities in vessels and surrounding tissue, which can be achieved through using blood pool contrast agents or blood flow effects. High resolution 3D angiograms have been acquired through computed tomography (CTA), magnetic resonance imaging (MRA), and Doppler ultrasound.

Unfortunately, in order to determine such a measurement, the clinician has to manually scroll through a voluminous number (e.g., over 100) of two dimensional (2D) images or slices (e.g., axial, coronal, sagittal, oblique, etc.) through the 3D volume to locate the stenosis. Once found, the clinician scrolls through the slices covering the stenosis to locate a slice for quantifying stenosis occlusion such as the slice that visually appears to have the greatest occlusion. This time intensive manual evaluation of the voluminous data set, however, can be burdensome for a clinician. Furthermore, the measurements are observer dependent and subject to human error. For example, the chosen slice and cutting angle can enhance or reduce the visible appearance of a stenosis.

Once such an image is located and identified, the clinician measures the vessel diameter to find the minimal diameter at the stenosis and the vessel diameter. This can be done through software based or other measurement tools using a complicated model to compute a diameter in an orthogonal cross section of a vessel. From the diameter measurement, the clinician can compute various metrics such as the NASCET (North American Symptomatic Carotid Endarterectomy Trial) criterium, which quantifies a stenosis in terms of percentage as follows: $(1-(\text{minimal vessel diameter}/\text{vessel diameter}))\times 100\%$. This provides an intuitive number between 0% and 100%, where 0% means no stenose and 100% means full occlusion.

Aspects of the present application address the above-referenced matters and others.

According to one aspect, a method includes generating, based on a distance map, a signal indicative of a quantification of a characteristic of a lumen of a tubular structure of interest over a pre-determined volume of the tubular structure of interest represented in volumetric imaging data.

According to another aspect, a system includes a quantifying component that generates, based on a distance map, a signal indicative of a quantification of characteristic of a lumen of a tubular structure of interest over a pre-determined volume of the tubular structure of interest represented in volumetric imaging data.

According to another aspect, a method includes identifying voxels of three dimensional segmented imaging data that represent tubular structure of interest, determining distances between the identified voxels and nearest voxels corresponding to other structure in a plurality of two dimensional slices of the segment imaging data, representing the voxels with intensity values that are proportional to the distances, and generating a signal indicative of a three dimensional distance map based on the intensity values.

The invention may take form in various components and arrangements of components, and in various steps and arrangements of steps. The drawings are only for purposes of illustrating the preferred embodiments and are not to be construed as limiting the invention.

Figure 1:
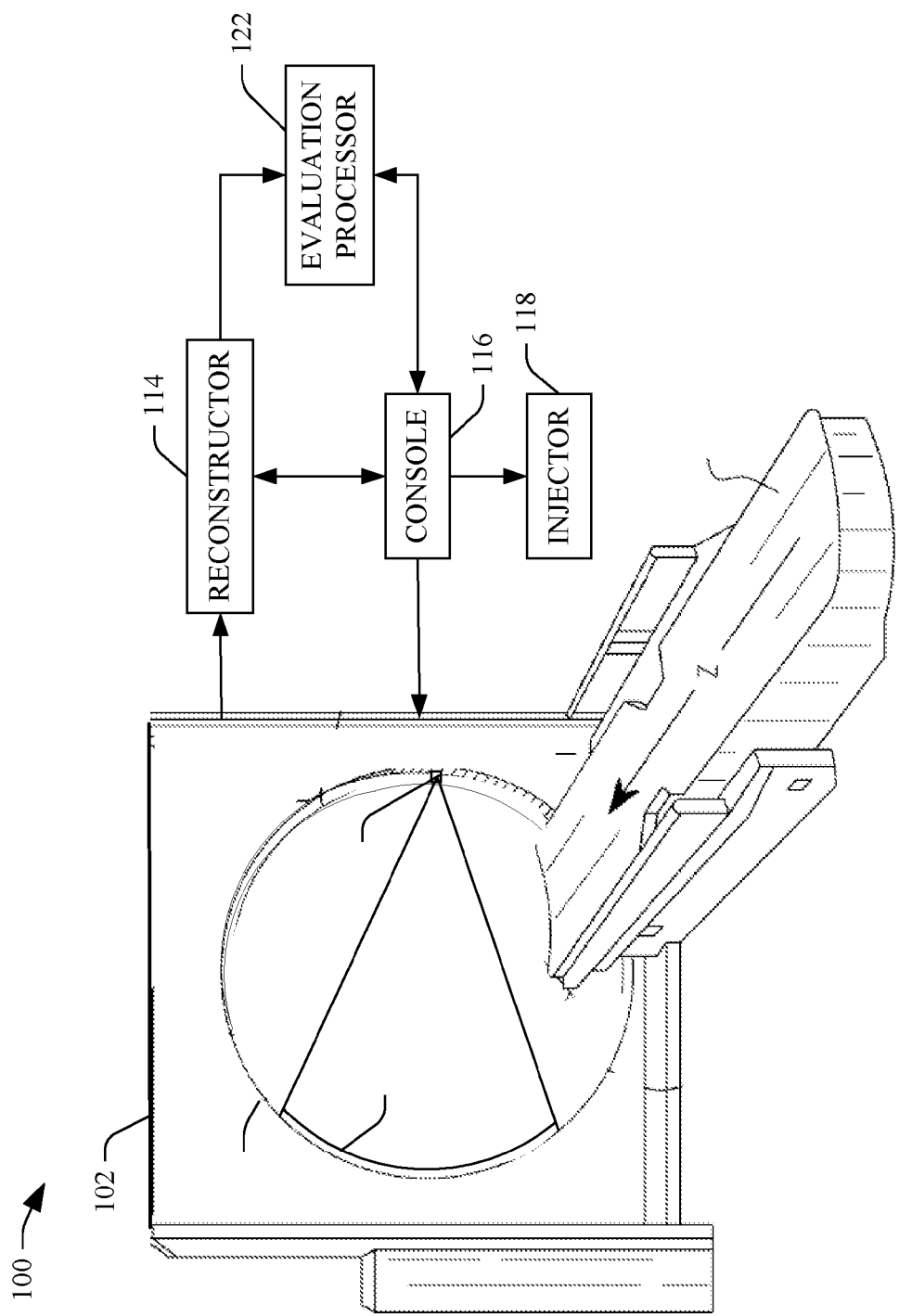
FIG. 1 illustrates an imaging system in connection with an evaluation processor.

FIG. 1 illustrates an imaging system 100 such as a computed tomography (CT) scanner. In other embodiments, the imaging system may additionally or alternatively include a different imaging modality such as magnetic resonance imaging (MRI), ultrasound (US) imaging, a combined modality scanner, and/or other scanner. The illustrated imaging system 100 is configured for performing non-contrast scans and contrast based scans, such as an angiography scan, as well as other contrast based scans.

The imaging system 100 includes a stationary gantry 102 and a rotating gantry 104, which is rotatably supported by the stationary gantry 102. The rotating gantry 104 rotates around an examination region 106 about a longitudinal or z-axis. A support 108, such as a couch, supports a subject in the examination region 106. The support 108 can be used to variously position the subject with respect to x, y, and/or z axes before, during and/or after scanning.

A radiation source 110, such as an x-ray tube, is supported by the rotating gantry 104 and rotates with the rotating gantry 104 about the examination region 106, and emits radiation that traverses the examination region 106. A one or two dimensional radiation sensitive detector array 112 is located opposite the radiation source 110, across the examination region 106, and detects radiation that traverses the examination region 106. The detector array 112 generates a signal or projection data indicative of the detected radiation.

A reconstructor 114 reconstructs the projection data and generates three dimensional (3D) volumetric image data (voxels) indicative of the examination region 106. A general purpose computing system serves as an operator console 116, and includes an output device such as a display and an input device such as a keyboard, mouse, and/or the like. Software resident on the console 116 allows the operator to control the operation of the system 100, for example, allowing the operator to select a technique (e.g., contrast enhanced), initiate scanning, etc.

An injector 118 is configured to inject or administer a contrast material(s), for example, for a contrast enhanced imaging procedure. The illustrated injector 118 is controlled by the console 116. In another instance, the injector 118 is manually controlled by a user or controller by another device. In yet another instance, the injector 118 is omitted, and the contrast agent is manually administered.

An evaluation processor 122 is configured to evaluate the image data. As described in greater detail below, in one instance the evaluation includes generating a signal indicative of a quantification of one or more characteristics of a tubular structure of interest represented in the image data. By way of non-limiting example, in one instance, where the tubular structure of interest includes a blood vessel, this may include quantifying a diameter of a the lumen of the blood vessels, which may facilitate quantifying an occlusion or obstruction of the blood vessel or a stretching of the lumen of the blood vessel, for example, in an accurate and/or reproducible manner. Again, this example is non-limiting and other tubular structures are also contemplated herein and/or other characteristics can be quantified.

It is to be appreciated that the evaluation processor 122 may be part of the console 116 and/or other computing system such as one or more computers. A suitable computing system includes one or more processors that execute one or more computer readable instructions encoded or embodied in computer readable storage medium such as local, portable, or remote physical memory. Additionally or alternatively, the one or more instructions may be carried by a carrier such as a signal or a wave. The one or more processors, when executing one or more of the instructions, cause the one or more processors to carry out the functionality of the evaluation processor 122 and/or other functionality.

Figure 2:
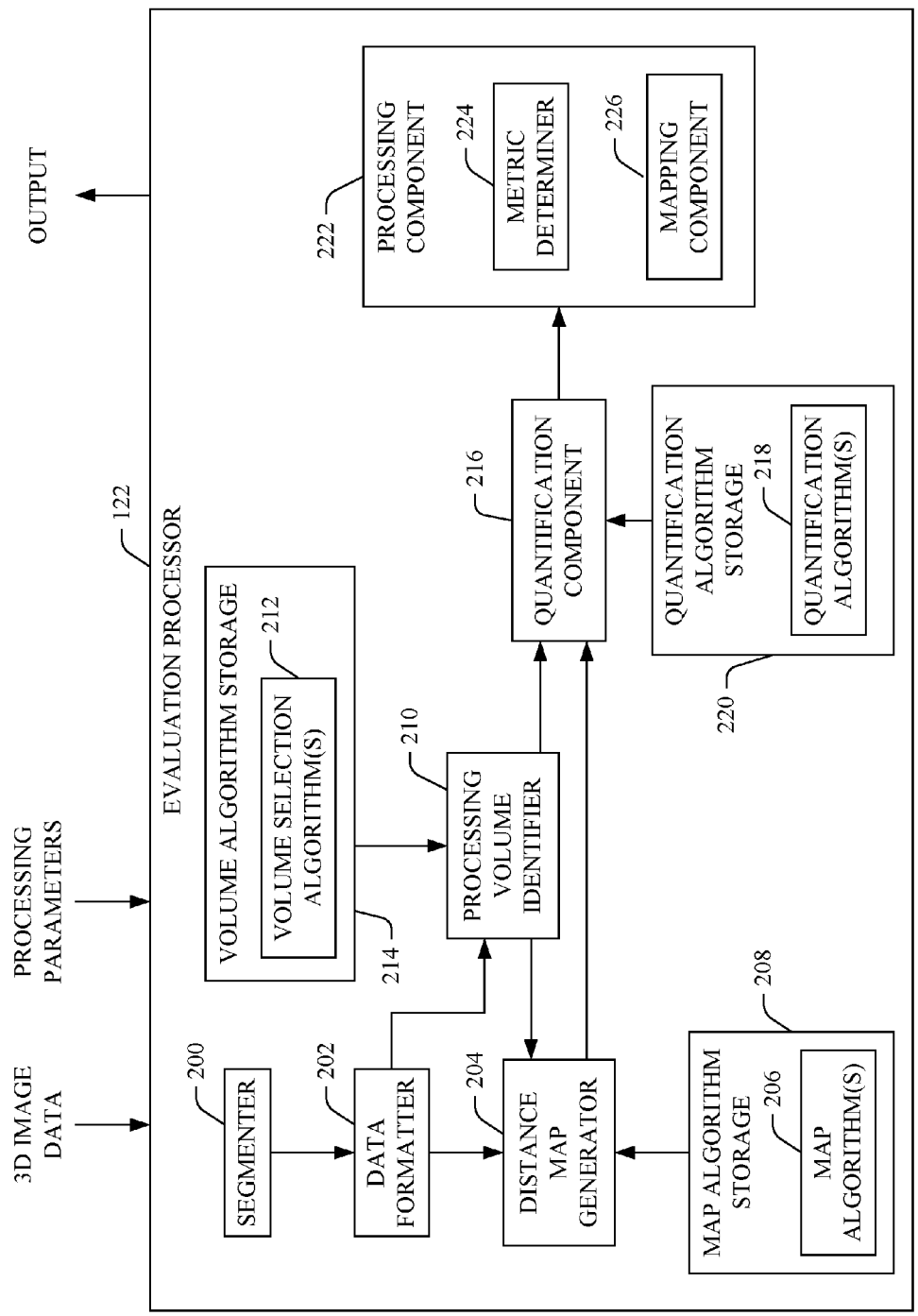
FIG. 2 illustrates an example evaluation processor.

FIG. 2 provides a non-limiting example of the evaluation processor 122.

In the illustrate embodiment, the evaluation processor 122 obtains, receives and/or retrieves 3D image data from the reconstructor 114, a data repository, and/or other device. The evaluation processor 122 also obtains, receives and/or retrieves various processing parameters, such as a voxel segmentation threshold, voxel segmentation identification information, evaluation start and/or end location, etc., from the console 116, a user, and/or other source. The output of the evaluation processor 122 includes a signal indicative of the evaluation.

A segmenter 200 segments the voxels in the image data into tubular structure of interest and other structure through automated, semi-automated and/or manual approaches. By way of example, in one instance the segmenter 200 employs a thresholding segmentation approach. With one thresholding approach, a predetermined voxel intensity threshold value can be used to classify voxels of the volumetric image data as either tubular structure of interest or other structure, for example, by identifying voxels with an intensity above the threshold as tubular structure of interest (or other structure) and identifying voxels with an intensity below the threshold as the other structure (tubular structure of interest). One or more other thresholds can additionally used. Using two thresholds allows for classifying voxels having an intensity between two thresholds as tubular structure of interest and all other voxels as other structure.

With another thresholding technique, a user provides an input indicative of the structure of interest and an input indicative of the other structure, and the segmenter 200 determines a suitable threshold. By way of example, the user may use a mouse or the like and click on a portion of the structure of interest to identify voxels representative of the structure of interest and click on a portion of the other structure to identify voxels representative of the structure of interest. The corresponding intensity values of the identified voxels can be averaged or otherwise used to determine the threshold. Other segmentation approaches can also be used. For example, in another instance, a user may manually identify the structure of interest and the other structure, for example, through various segmentation tools that allow a user to identify particular structure through a free hand outline tool, a re-sizeable predetermined geometric shape, etc.

A data formatter 202 formats the segmented data for further processing by the evaluation processor 122. In one instance, this may include re-sampling the segmented image data to change the slice thickness of the individual slices making up the 3D volume. In yet another instance, this may include re-sampling the segmented image data to generate slices in other directions such as sagittal, coronal, oblique and/or other slices. Where the evaluation processor 122 processes the segmented data based on the slice format from the scan, the data formatter 202 can be omitted. The particular formatting employed may be a default, user specified, subject specific, and/or other formatting.

A distance map generator 204 generates a signal indicative of a distance map for the tubular structure of interest for one or more of the slices of the 3D volume. In one non-limiting instance, a suitable algorithm includes identifying a region of voxels representing the tubular structure of interest (e.g., based on the segmentation), determining a shortest distance for one or more of the voxels representing the structure of interest to a nearest voxel representing the different structure, and assigning the voxel via an intensity value proportional to the shortest distance. With this approach, the farther away of voxel representing the tubular structure of interest is to a nearest voxel representing the different structure, the higher (or lower) the relative intensity value will be. The distance map generator 204 can employ one or more algorithms to generate the map, such as one or more mapping algorithms 206 from map algorithm storage 208.

A processing volume identifier 210 identifies and generates a signal indicative of a volume of the tubular structure of interest in the formatted segmented image data to be processed. In one non-limiting instance, the processing volume identifier 210 identifies a volume of the structure of interest based on one or more inputs indicative of the volume. For example, in one instance a user may employ a mouse or the like to identify a start point and an end point of the structure of interest from a graphical presentation (e.g., via a graphical user interface presented via a monitor, display, or the like) of the formatted segmented imaged. The user may also identify a path between the start and ends points and/or one or more points of interest along the path.

In another instance, the user may identify one point of the structure of interest, and a predetermined range (e.g., ±5 mm) about point may be utilized to determine the volume. The processing volume identifier 210 can employ one or more algorithms to identify the volume, such as one or more volume selection algorithms 212 from volume algorithm storage 214. In an alternative embodiment, the processing volume identifier 210 is used to identify and generate the signal indicative of the volume of the tubular structure of interest prior to generating distance map, and the distance map generator 204 is subsequently used to generate distance map for one or more of the slices covering the identified volume.

A quantification component 216 quantifies various characteristics of the identified volume of the tubular structure of interest from one or more slices of the 3D segmented data covering the volume based on corresponding 2D slices from the distance map. The quantification component 216 can employ one or more algorithms to identify such information, such as one or more quantification algorithms 218 from quantification algorithm storage 220.

In one non-limiting embodiment, a pre-determined geometric shape such as an elastic ball is moved through the tubular structure of interest, and a local metric extent such as a radius or diameter of the ball is determined at the one or more points along the tubular structure of interest where the ball is grown as large as possible at a point while being enclosed by the tubular structure of interest. In one instance, the ball is moved such that a center of the ball is moved along the local extent. In another instance, the ball is otherwise moved long the local extent. A radius of the ball can be determined by determining a maximum of the values of a 2D slice of the distance map where the slice goes through the point or by determining a maximum of the values of a 2D slice of the distance map where the slice is orthogonal to a longitudinal axis of the tubular structure. The extent can be determined as an area of the tubular structure of interest in a slice orthogonal to a direction of the path at the point.

A processing component 222 can variously process the signal generated and output by the quantification component 216. In the illustrated embodiment, the processing component 222 includes a metric determiner 224 that is configured to determine one or more state (e.g., health) metrics based on the signal from the quantification component 216. An example of a suitable metric includes a metric that indicates a percentage of occlusion. One such metric can be determined based on EQUATION 1:

$$\left(1 - \frac{\text{minimum diameter}}{\text{average diameter}}\right) \times 100\%, \quad \text{EQUATION 1}$$

wherein a value of zero (0) represents substantially no occlusion, . . . , a value of fifty (50) represents half occlusion, . . . , and a value of one hundred (100) represents substantially total or full occlusion.

In EQUATION 1, the minimum diameter can represent 1) the actual smallest diameter of the diameter values, 2) an average of a range of smallest diameters, 3) a diameter at a user selected or predetermined location along the path, or 4) other diameter. The average diameter can represent 1) an average of all the diameters, 2) an average of diameters within a range of diameters deemed to represent a normal state of the tubular structure, 3) an average diameter over a user selected or predetermined range along the path, or 4) other diameter. Furthermore, a largest diameter can substitute for the average diameter.

In a variation, the minimum diameter in EQUATION 1 can be replaced by the largest diameter to determine, for example, a characteristics corresponding to a stretching of the tubular structure of interest. One or more approaches can also be employed to identify diameter values not well suited to be used in EQUATION 1. For example, the diameter of the tubular structure may increase at a region at which the tubular structure of interest connects with other structure. Using the values of such a region when determining the parameters of EQUATION 1 may lead to an erroneous average diameter. Identifying such values allows for ignoring, discarding, correcting, and/or otherwise handling these values.

Figure 3:
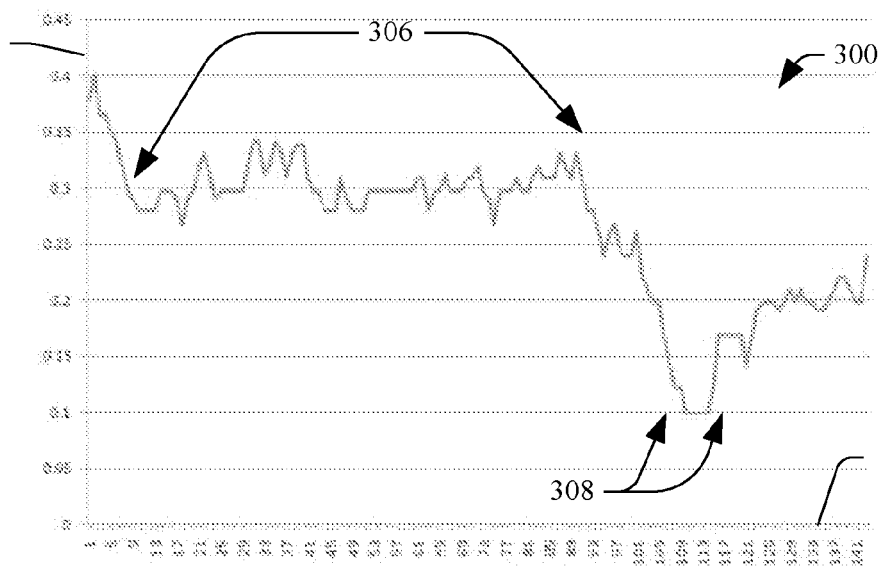
FIG. 3 illustrates an example plot of a diameter of a tubular structure as a function of the two dimensional slices of a three dimensional data set.

The illustrated processing component 222 also includes a mapping component 226 that generates a signal indicative of a mapping between the diameter values of the tubular structure of interest over the identified volume and corresponding slices of the image data covering the identified volume. In one instance, the signal can be presented as shown in FIG. 3 as curve 300. In FIG. 3, for this example, the y-axis 302 represents the diameter value and the x-axis 304 represents the slice number, where the slices begin with the number one (1) and successively increment up to the last slice in the slices covering the identified volume. The slice index on the y-axis may be with respect to a slicing direction orthogonal to the direction of the tubular structure.

In FIG. 3, a region 306 represents diameter values around an unoccluded region of the tubular structure of interest and a region 308 represents diameter values around an occluded region of the tubular structure of interest. Other regions of the curve 300 represent diameter values for transitions regions and may not be well-suited to be included for determining tubular structure of interest diameter or minimal tubular structure of interest diameter. From the curve 300, diameter values can be obtained, and these values can be used to determine a percent occlusion or other information, and/or identify corresponding slices of the image data. The signal can also be utilized to obtain such and/or other information without displaying the curve 300.

Figure 4:
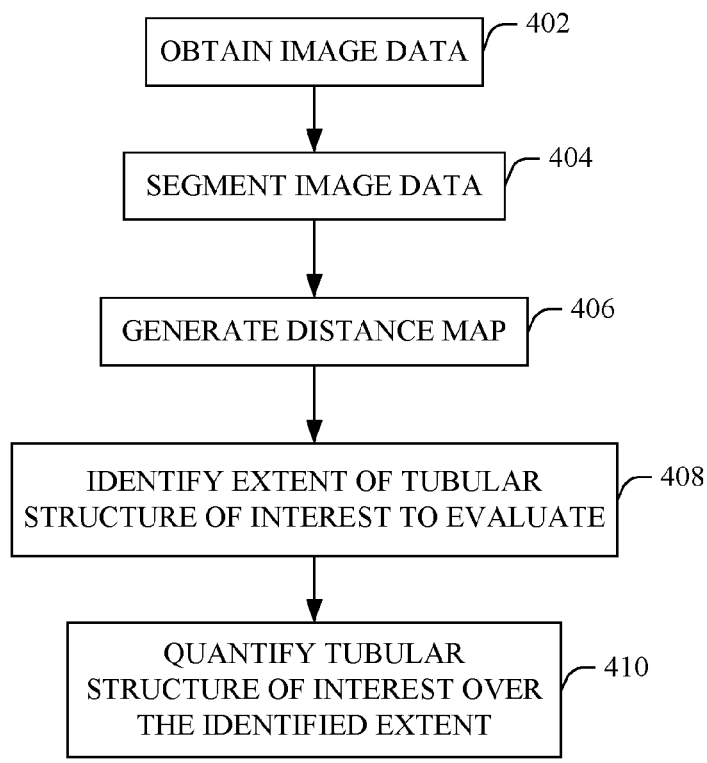
FIG. 4 illustrates a method for quantifying a characteristic of a lumen of a tubular structure of interest.

FIG. 4 illustrates a method for quantifying a characteristic of a tubular structure of interest.

At 402, volumetric image including the structure of interest and other structure is obtained.

At 404, the volumetric image data is segmented into the structure of interest and the other structure.

At 406, a three dimensional distance map is generated for the volumetric image data, as discussed herein.

At 408, a volume of the tubular structure of interest to be quantified is identified from the segmented volumetric image data.

At 410, a characteristic of the tubular structure of interest, over the identified volume, is quantified based on the distance map.

Figure 5:
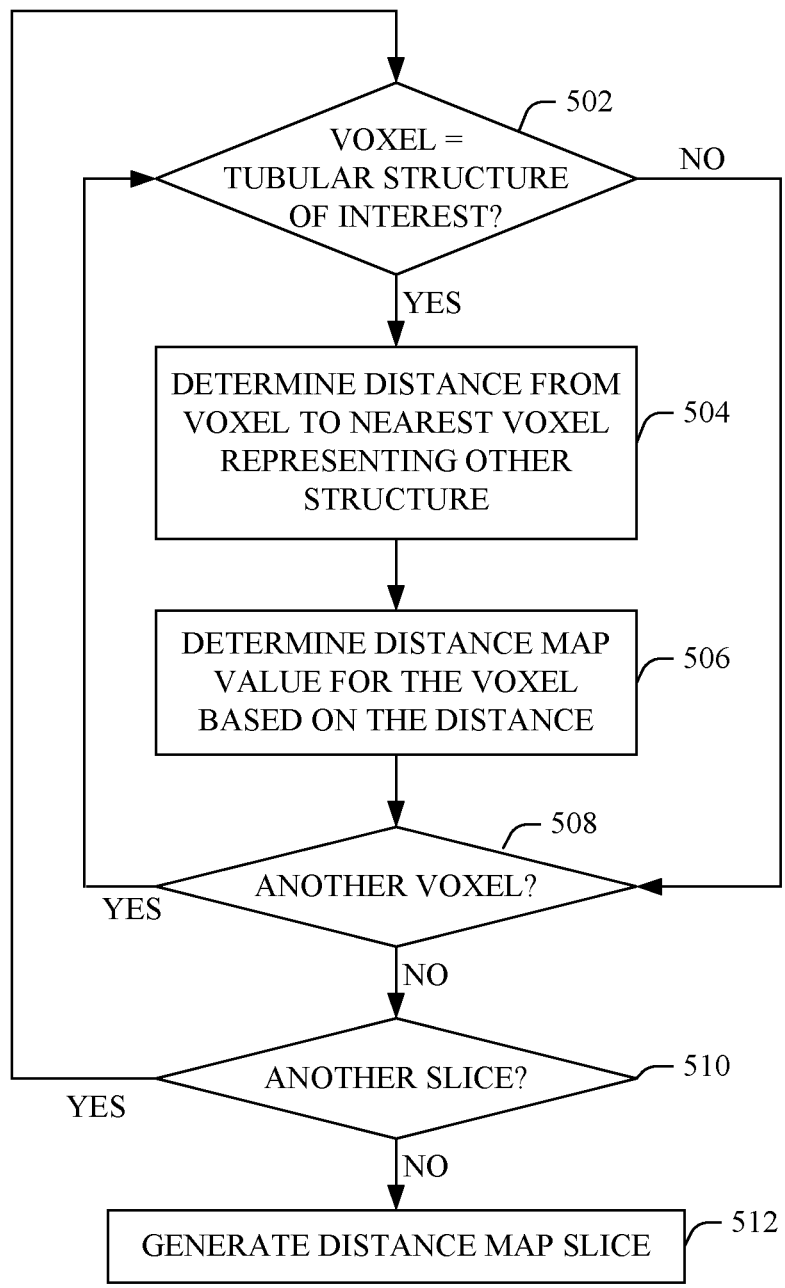
FIG. 5 illustrates a non-limiting method for generating a distance map.

FIG. 5 illustrates a non-limiting method for generating a distance map, for example, for act 406 of FIG. 4.

At 502, a voxel from a two dimensional slice of the segmented image data is identified as tubular structure of interest or other structure.

If the voxel is identified as tubular structure of interest, then at 504 a distance from the voxel to a nearest voxel representing the other structure is determined.

At 506, an intensity value for the voxel that is proportional to the distance is generated and stored.

At 508, it is determined whether there is another voxel to evaluate.

If so, then act 502 is repeated.

If not, then at 510, a signal indicative of the intensity values is generated and output as a 2D slice of the distance map.

If at 502 the voxel is identified as other structure, then act 508 is performed.

At 512, it is determined whether there is another slice to evaluate.

If so, then act 502 is repeated for this slice.

If not, then as act 514, the distance map slices are combined, thereby forming the 3D distance map.

Figure 6:
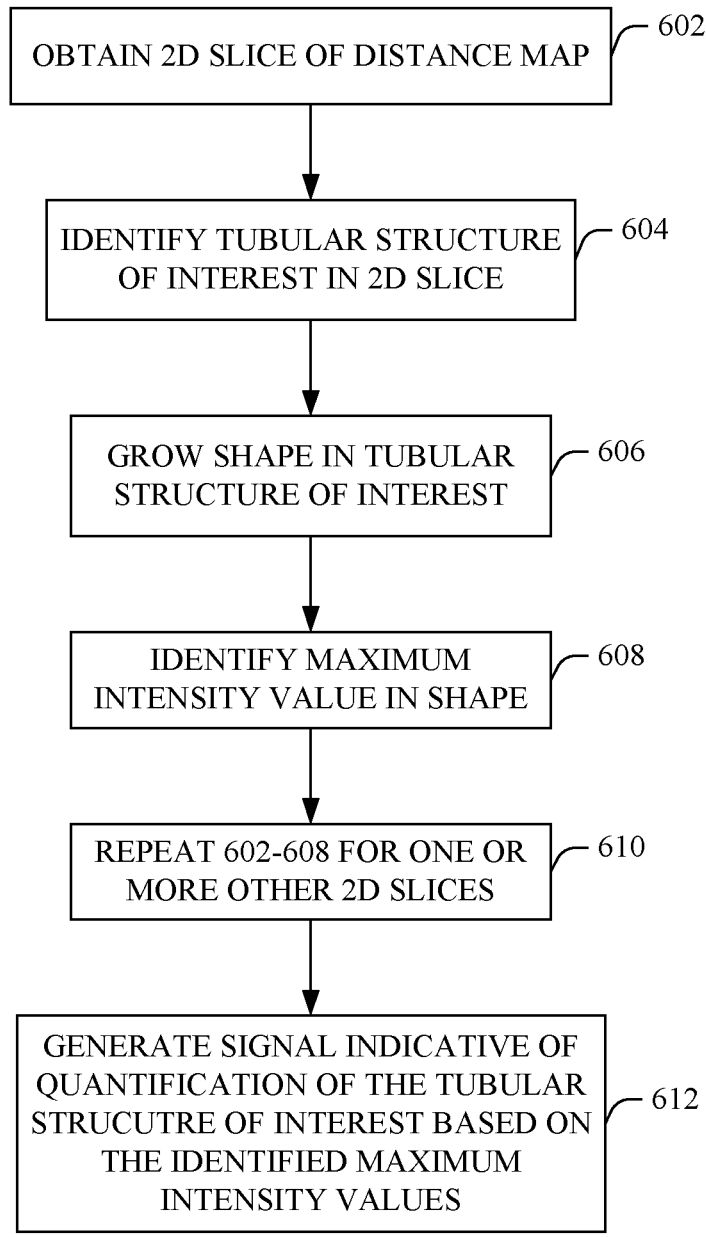
FIG. 6 illustrates a non-limiting method for quantifying the characteristic over an identified volume based on a distance map.

FIG. 6 illustrates a non-limiting method for quantifying a characteristic of a lumen of the tubular structure of interest, for example, as in act 410 of FIG. 4.

At 602, a 2D slice of the distance map corresponding to a point along the tubular structure of interest is obtained.

At 604, tubular structure of interest is identified in the 2D slice.

At 606, a geometric shape is grown in the identified tubular structure of interest until the shape covers all voxels in the slice that are connected to the point chosen in 602.

At 608, a maximum of the voxel intensity values of the 2D slice in the shape is identified and stored. Recall that the intensity values correspond to distances from voxels of the structure of interest to nearest voxels of other structure.

At 610, acts 602-608 are repeated for one or more other points along the tubular structure of interest.

At 612, a signal indicative of a quantification of the tubular structure of interest over the points is generated based on the maximum intensity values. By way of example, this may include identifying a maximum of the maximum of the intensity values and a minimum of the maximum of the intensity values, and determining a ratio of the maximum to minimum, or one minus the ratio.

It is to be appreciated that the ordering of the acts is not limiting. As such, in other embodiments, the ordering of the acts may be different. In addition, one or more of the acts can be omitted and/or one or more other acts can be added.

The above described acts may be implemented by way of computer readable instructions, which, when executed by a computer processor(s), causes the processor(s) to carry out the acts described herein. In such a case, the instructions are stored in a computer readable storage medium such as memory associated with and/or otherwise accessible to the relevant computer.

The foregoing can be applied for investigation of tubular structures such as a blood vessel, the colon, etc., including, but not limited to, quantifying stenoses and generating stenoses indices on CT, MRI or ultrasound three dimensional datasets, quantifying an aneurysm, quantifying a polyp, and/or other structure that can occlude a tubular structure.

By way of non-limiting example, the system 100 can be utilized for a contrast enhanced study of one or more blood vessels (e.g., left carotid artery) for characterizing a stenosis. The three dimensional volume of image data from the scan is segmented into vessels and non vessels. In one embodiment, this can be achieved by clicking once inside a vessel and once outside, and using the average of the two intensities of these points for thresholding.

A distance map is computed which contains as voxel intensities indicative of the distance of the voxel to the nearest non-vessel voxel. The distance map is a three dimensional data set with the same dimensions as the original data set. The user provides at least one of a start or an end point of a vessel of interest. Likewise, this can be achieved by clicking on a start point for the vessel and an end point for the vessel via the three dimensional volume of segmented data.

The distance map is re-sampled to get equidistant slices orthogonal to the line between start and end point. At each slice, the voxel inside the vessel of interest and having maximum intensity of the distance map is found. This voxel is at the center of the largest fitting sphere in that slice. This diameter can be found in any 2D slice. The course or local extent from the start point to the end point can be presented to the user, for example, as shown in FIG. 4.

A stenotic diameter can be found from the minimum of this curve. A distal diameter index can be found by computing the maximal value over the complete curve or a subset around the stenosis. The foregoing allows a clinician (e.g., a radiologist and/or a scientist) to accurately and reproducibly compute a degree of stenosis by interactively selecting the start and end points of blood vessels. This includes providing acceptable results in tough positions such as vessel junctions or touching vessels that could not be separated by the segmentation.

In one particular embodiment, this approach can be used to determine the stenoses diameter for contrast enhanced dual energy CT scans. This may be particularly useful because the dual energy scans allow separation of blood vessels and calcified plaques, which both appear bright in contrast enhanced CT. Another use case is preclinical research on atherosclerosis.

The invention has been described with reference to the preferred embodiments. Modifications and alterations may occur to others upon reading and understanding the preceding detailed description. It is intended that the invention be constructed as including all such modifications and alterations insofar as they come within the scope of the appended claims or the equivalents thereof.

The invention claimed is:

1. A method, comprising:
   generating, based on a voxel distance map, a signal indicative of a quantification of a characteristic of a lumen of a tubular structure of interest over a predetermined volume of the tubular structure of interest represented in volumetric imaging data;
   receiving a selected start point and end point of the tubular structure of interest;
   determining a state metric from the quantification that indicates a percentage of occlusion of the tubular structure of interest between the selected start point and end point; and
   wherein the percentage of occlusion is based on a selected diameter and a minimum diameter between the start and end points, wherein the selected diameter includes at least one of: an average of all diameters between the selected start point and end point, or an average of all diameters over a predetermined range along a path of the lumen.

2. The method of claim 1, further comprising:
   segmenting the volumetric imaging data into one or more regions of tubular structure and one or more regions of other structure that occludes the tubular structure;
   determining for one or more voxels of the one or more regions of tubular structure a distance to a nearest voxel of other structure;
   determining one or more intensity values for the one or more voxels, wherein an intensity value for a voxel is proportional to the corresponding determined distance; and
   generating the distance map based on the intensity values.

3. The method of claim 2, further comprising:
   identifying a sub region of the one or more regions of tubular structure as a tubular structure of interest based on the selected start point and end point;
   determining a local metric extent of the tubular structure of interest based on the distance map values; and determining the quantification of characterization of the tubular structure of interest as a function of the local metric extent.

4. The method of claim 3, further comprising:
determining a path from the selected start point to the end point;
determining a plurality of points along the path; and
determining the local metric extent of the tubular structure of interest at the points.

5. The method of claim 4, wherein the local metric extent is a radius or diameter of the tubular structure of interest at the one or more points.

6. The method of claim 5, wherein determining the radius or diameter includes moving an elastic ball through the tubular structure of interest and determining a radius or diameter of the ball at the one or more points, wherein the ball is as large as possible at a point while being enclosed by the tubular structure of interest.

7. The method of claim 3, further comprising:
determining the local metric extent for a point as an area of the tubular structure of interest in a slice orthogonal to a direction of a path at the point.

8. The method of claim 3, wherein the volumetric image data includes dual energy CT data which separates blood vessels from calcified plaque;
wherein segmenting includes separately segmenting the one or more regions of the tubular structure which include blood vessels and segmenting the one or more regions of the tubular structure which includes calcified plaque; and
wherein a quantification of a characteristic of the lumen of the tubular structure of interest includes a diameter of the blood vessel and a diameter of the calcified plaque.

9. The method of claim 1, wherein tubular structure of interest is a blood vessel and the quantification characteristic is a diameter or radius of the blood vessel.

10. The method of claim 9, wherein the diameter or radius is indicative of a stenosis or an aneurysm of the blood vessel.

11. The method of claim 3, wherein values of the plurality of points along a path are mapped to corresponding positions of the imaging data.

12. A system, comprising:
a quantifying component that generates, based on a distance map, a signal indicative of a quantification of a characteristic of a lumen of a tubular structure of interest over a pre-determined volume of the tubular structure of interest represented in volumetric imaging data, and determines a state metric from the quantification that indicates a percentage of occlusion of the tubular structure of interest between a selected start point and end point; and
wherein the percentage of occlusion is based on a selected diameter and a minimum diameter between the start and end points, wherein the selected diameter includes at least one of: an average of all diameters between the selected start point and end point, or an average of diameters over a selected range between two end points of the range along a path of the lumen.

13. The system of claim 12, further comprising:
a segmenter that segments the volumetric imaging data into tubular structure of interest and other structure; and
a distance map generator that generates the distance map, wherein the distance map includes intensity values indicative of distances from voxels representing the tubular structure of interest and to nearest voxels representing the other structure.

14. The system of claim 12, wherein the characteristic includes a radius or diameter of the tubular structure of interest.

15. The system of claim 12, wherein the metric is a diameter or radius of the tubular structure of interest corresponding to one or more points along the tubular structure of interest.

16. A method, comprising:
identifying voxels of three dimensional segmented imaging data that represent tubular structure of interest;
determining distances between the identified voxels and nearest voxels corresponding to other structure in a plurality of two dimensional slices of the segment imaging data;
representing the voxels with intensity values that are proportional to the distances;
generating a signal indicative of a three dimensional distance map based on the intensity values;
quantifying a characteristic of a lumen of the tubular structure of interest between a selected start point and end point of the tubular structure of interest represented in the three dimensional segmented imaging data based on the distance map;
determining a state metric from the quantified characteristic that indicates a percentage of occlusion of the tubular structure of interest between the selected start point and end point; and
wherein the percentage of occlusion is based on selected diameter and a minimum diameter between the start and end points, wherein the selected diameter includes at least one of: an average of all diameters between the selected start point and end point, or an average of diameters over a predetermined range between two end points of the range along a path of the lumen.

17. The method of claim 16, wherein the characteristic includes a radius or diameter of the tubular structure of interest.

18. The method of claim 16, further comprising:
mapping the quantification to corresponding slices of the three dimensional segmented imaging data; and
presenting the mapping.

19. A method of determining stenosis of a tubular structure, comprising:
segmenting image data to identify the tubular structure in the image data;
moving an elastic ball through the identified tubular structure to determine a diameter of the tubular structure between a selected starting point and ending point; and
presenting a graphical display of the determined diameter of the tubular structure between the selected starting point and ending point on a display to identify potential areas of stenosis;
wherein tubular structure of interest is a blood vessel and the diameter quantifies the stenosis, and the display presents a percentage occlusion between the selected starting point and ending point on the display; and
wherein the percentage of occlusion is based on a selected diameter and a minimum diameter between the start and end points, wherein the selected diameter includes at least one of: an average of all diameters between the selected start point and end point, or an average of at least three diameters over a selected range along a path of the lumen.

20. The method of claim 19, further comprising:

determining for one or more voxels of one or more regions of identified tubular structure a distance to a nearest voxel of other structure;

determining one or more intensity values for the one or more voxels, wherein an intensity value for a voxel is proportional to the corresponding determined distance; and generating a distance map based on the intensity values.

21. The method of claim 20, wherein the diameter at a point along the tubular structure is a maximum value of a 2D slice of the distance map that goes through the point.

22. The method of claim 20, wherein the radius or diameter at a point along the tubular structure is a maximum value of a 2D slice of the distance map that is orthogonal to a longitudinal axis of the tubular structure.

23. The method of claim 19, wherein values of the plurality of points along a path are mapped to corresponding positions of the imaging data.

* * * * *